May 11, 1926.

F. D. CORNELL

LAMP FOR INCUBATORS

Filed Sept. 15, 1923

1,584,014

INVENTOR
FAY D. CORNELL
BY
ATTORNEY

Patented May 11, 1926.

1,584,014

UNITED STATES PATENT OFFICE.

FAY D. CORNELL, OF SUNNYVALE, CALIFORNIA.

LAMP FOR INCUBATORS.

Application filed September 15, 1923. Serial No. 662,876.

My invention is an improved lamp, particularly applicable to incubators.

The object of my invention is to provide a lamp which may be readily refilled with a minimum amount of effort and which is so constructed that the entire capacity of the bowl is available for the use of the fuel.

A further object of my invention is to provide a means of protecting the wick from water which accumulates in the bottom of the bowl.

A further object of my invention is to provide supporting means for the bowl from which said bowl may be readily removed for cleaning and inspection.

In the annexed drawing in which my invention is illustrated:

Figure 1:
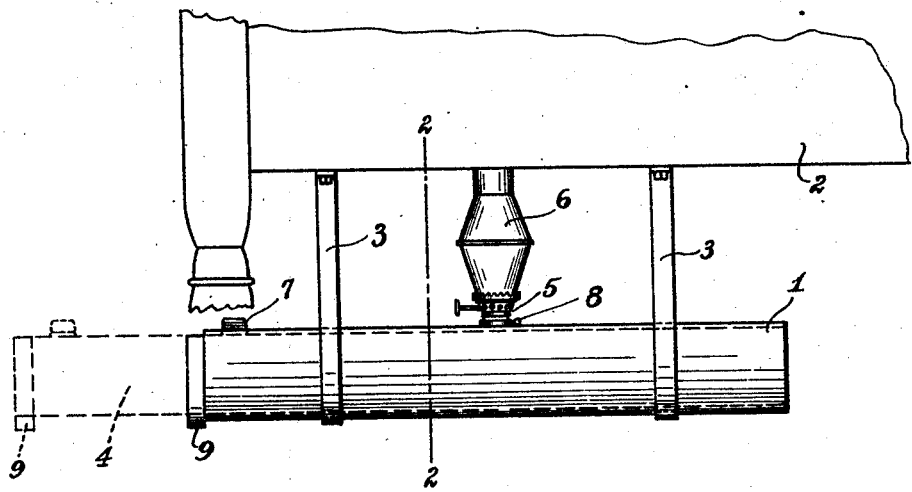
Figure 1 is a fragmentary side view of an incubator with my lamp attached thereto.
Figure 2:
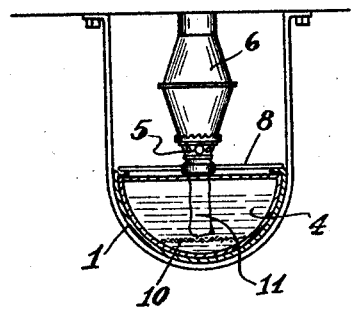
Figure 2 is a sectional view taken on the line 2—2 of Fig. 1.
Figure 3:
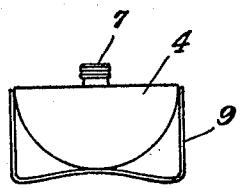
Figure 3 is an end view of the burner bowl positioned in the supporting frame.

Referring more particularly to the drawing, a shell 1 is supported from the incubator 2 by means of a plurality of hangers 3 which are secured to the incubator and encircle the shell 1. A bowl 4, which is preferably semi-cylindrical in shape, is adapted to slide within the shell 1 and is supported thereby. A burner 5 is positioned in the top of the bowl 4 and a suitable chimney 6 fits over the burner 5 and extends into the incubator 2 in the usual manner to heat said incubator.

A filling cap 7 is positioned near the forward end of the bowl 4 whereby said bowl may be filled and cleaned when desired. A rod 8 is positioned on top of the shell 1 and secured thereto, and acts as a stop for the bowl 4. The burner 5 coming in contact therewith positions the bowl within the shell 1 and enables the chimney 6 to be drawn down upon the burner.

When it is desired to fill the bowl, it is merely withdrawn slightly from the shell 1 as shown in dotted lines in Figure 1, where it may be readily filled from the filling can. When it is desired to inspect or clean the bowl, it may be entirely withdrawn from the shell 1 and is supported upon legs 9 formed on the forward end thereof, which hold it in an upright position.

A screen 10 is positioned adjacent the bottom of the bowl 4 upon which the wick 11 rests. Any condensation or water will fall to the bottom and will ordinarily remain below the screen 10 and consequently cannot rise into the wick 11 and decrease capillary action therein.

The shape of my lamp as well as the length gives it sufficient capacity to carry oil for approximately half of the entire hatching period—that is the lamp does not require to be filled more than once or twice. This is accomplished with a standard wick and with the usual size of chimney. This material reduces the amount of work required of the operator.

Having described my invention, I claim:

1. In combination with an incubator, an elongated shell, means extending from said incubator and adapted to support said shell, a lamp bowl adapted to be moved lengthwise of said shell, a burner on said bowl and a chimney adapted to be positioned over said burner.

2. In combination with an incubator, a shell, means suspended from said incubator and adapted to support said shell, a bowl slidably mounted within and adapted to conform in shape to said shell, a burner carried by said bowl and a filler cap adjacent the outer end of said bowl.

3. In combination with an incubator, an elongated shell, means suspended from said incubator and adapted to support said shell, a bowl slidably mounted within and of a size to conform to the shape of said shell, a burner carried by said bowl, a filler cap adjacent the outer end of said bowl, a chimney adapted to extend from said burner to said incubator and a stop rod secured to said shell and adapted to be engaged by said burner.

In testimony whereof I affix my signature.

FAY D. CORNELL.